(12) United States Patent
Renault

(10) Patent No.: US 11,248,564 B2
(45) Date of Patent: Feb. 15, 2022

(54) COOLING CIRCUIT MANAGEMENT FOR TRANSPORT REFRIGERATION UNIT GAS ENGINE

(71) Applicant: Carrier Corporation, Palm Beach Gardens, FL (US)

(72) Inventor: Loic Renault, Saint Etienne du Rouvray (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/964,028

(22) PCT Filed: Jan. 26, 2018

(86) PCT No.: PCT/IB2018/000200
§ 371 (c)(1),
(2) Date: Jul. 22, 2020

(87) PCT Pub. No.: WO2019/145744
PCT Pub. Date: Aug. 1, 2019

(65) Prior Publication Data
US 2021/0040917 A1    Feb. 11, 2021

(51) Int. Cl.
*F01P 3/20* (2006.01)
*F01P 3/00* (2006.01)
(Continued)

(52) U.S. Cl.
CPC .............. *F02M 21/06* (2013.01); *F01P 3/20* (2013.01); *F01P 7/16* (2013.01)

(58) Field of Classification Search
CPC ........ F01P 3/20; F01P 3/00; F01P 1/06; F01P 2007/146; F01P 7/00
See application file for complete search history.

(56) References Cited

U.S. PATENT DOCUMENTS 4,858,825 A * 8/1989 Kawamura ............. F23N 5/242
                                                    237/2 A
6,079,629 A * 6/2000 Morikawa ............ B60H 1/2206
                                                    237/12.3 C
(Continued)

FOREIGN PATENT DOCUMENTS

CA    2862664 A1    11/2014
DE    3426514 A1    1/1986
(Continued)

OTHER PUBLICATIONS

Internation Search Report and Written Opinion App. No. PCT/IB2018/000200; dated Jun. 26, 2018, pp. 3.

*Primary Examiner* — Long T Tran
(74) *Attorney, Agent, or Firm* — Cantor Colburn LLP

(57) ABSTRACT

A governing system of an engine coolant control system in which first and second portions of coolant are pumped from an engine to a regulator and back to the engine and from the engine to a radiator and back to the engine, respectively, is provided. The governing system includes a temperature sensor of the engine to sense coolant temperatures, an ambient temperature sensor of the radiator to sense ambient temperatures, a heating element disposed to heat the first portion of the coolant at one of a location upstream from the regulator and the regulator, a valve operably disposed along a section of piping through which the first portion of the coolant flows from the engine to the regulator and a controller which controls operations of the heating element and the valve in accordance with the readings of the temperature sensor of the engine and the ambient temperature sensor.

19 Claims, 4 Drawing Sheets

(51) Int. Cl.
*F01P 7/00* (2006.01)
*F02M 21/06* (2006.01)
*F01P 7/16* (2006.01)

(56) References Cited

U.S. PATENT DOCUMENTS

| | | | | |
|---|---|---|---|---|
| 6,260,545 | B1* | 7/2001 | Suzuki | F23N 1/022 |
| | | | | 123/550 |
| 7,451,747 | B2* | 11/2008 | Hayashi | F02D 19/022 |
| | | | | 123/557 |
| 2003/0010022 | A1* | 1/2003 | Suzuki | F02D 41/003 |
| | | | | 60/286 |
| 2009/0012695 | A1* | 1/2009 | Kernwein | F02P 19/026 |
| | | | | 701/102 |
| 2015/0165871 | A1* | 6/2015 | Miller | B60H 1/2209 |
| | | | | 237/28 |

FOREIGN PATENT DOCUMENTS

| | | |
|---|---|---|
| WO | 2011144286 A1 | 11/2011 |
| WO | 2015000075 A1 | 1/2015 |
| WO | 2016131147 A1 | 8/2016 |

\* cited by examiner

COOLING CIRCUIT MANAGEMENT FOR TRANSPORT REFRIGERATION UNIT GAS ENGINE

CROSS-REFERENCE TO RELATED APPLICATIONS

This application is a National Phase of PCT Application No. PCT/IB2018/000200 filed Jan. 26, 2018 the disclosure of which is incorporated herein by reference in its entirety.

BACKGROUND

The following description relates to transport refrigeration units (TRUs) and, more specifically, to a system of cooling circuit management system for a TRU using a compressed or liquefied gas engine.

Compressed natural gas (CNG) powered trucks are typically equipped with undermounted gas tanks as well as primary pressure regulators. This leads to there being a distance between primary and secondary pressure regulators that in turn increases a risk of liquefied gas being provided inside gas piping instead of vaporized gas. The presence of the risk of liquefied gas being provided inside the gas piping requires that a secondary regulator warm-up process be mandatorily executed in cold or even normal weather conditions. The primary and secondary regulators are designed such that a direct engine fluid heating source (such as engine coolant) may be necessary.

BRIEF DESCRIPTION

According to an aspect of the disclosure, a governing system of an engine coolant control system in which first and second portions of coolant are pumped from an engine to a regulator and back to the engine and from the engine to a radiator and back to the engine, respectively, is provided. The governing system includes a temperature sensor of the engine to sense coolant temperatures, an ambient temperature sensor of the radiator to sense ambient temperatures, a heating element disposed to heat the first portion of the coolant at one of a location upstream from the regulator and the regulator, a valve operably disposed along a section of piping through which the first portion of the coolant flows from the engine to the regulator and a controller which controls operations of the heating element and the valve in accordance with the readings of the temperature sensor of the engine and the ambient temperature sensor.

In accordance with additional or alternative embodiments, the heating element includes a glow plug or a heater resistor.

In accordance with additional or alternative embodiments, the valve includes a throttling valve.

In accordance with additional or alternative embodiments, a signal issued from the controller to the throttling valve to control operations of the throttling valve includes a pulse width modulation (PWM) signal.

According to another aspect of the disclosure, an engine coolant control system is provided. The engine coolant system includes an engine, a radiator, a regulator through which gas is flown prior to being flown toward the engine, a piping system and a governing system. The engine coolant system further includes a temperature sensor of the engine to sense coolant temperatures. The radiator includes an ambient temperature sensor to sense ambient temperatures. The piping system is provided such that first and second portions of coolant are pumped from the engine to the regulator and back to the engine and from the engine to the radiator and back to the engine, respectively. The governing system governs a temperature of the first portion of the coolant and an amount of the first portion of the coolant permitted to flow from the engine to the regulator in accordance with readings of the temperature sensor of the engine and the ambient temperature sensor.

In accordance with additional or alternative embodiments, the engine includes a compressed natural gas (CNG) engine.

In accordance with additional or alternative embodiments, the radiator includes a heat exchanger in which the second portion of the coolant thermally interacts with a flow of ambient air.

In accordance with additional or alternative embodiments, the regulator includes a secondary regulator and is fluidly interposed between a primary regulator of a gas tank and a mixer of the engine.

In accordance with additional or alternative embodiments, the secondary regulator is receptive of gas from the primary regulator along gas piping which is on an order of 1-10 meters in length.

In accordance with additional or alternative embodiments, the piping system includes a coolant pump configured to pump the first and second portions of the coolant toward the regulator and the radiator, respectively, and a coolant thermostat which moderates relative quantities of the first and second portions.

In accordance with additional or alternative embodiments, the governing system includes a heating element disposed to heat coolant at one of a location upstream from the regulator and the regulator, a valve operably disposed along piping interposed between the engine and the regulator and a controller which controls operations of the heating element and the valve in accordance with the readings of the temperature and the ambient temperature sensors.

In accordance with additional or alternative embodiments, the heating element includes a glow plug or a heater resistor.

In accordance with additional or alternative embodiments, the valve includes a throttling valve.

In accordance with additional or alternative embodiments, a signal issued from the controller to the throttling valve to control operations of the throttling valve includes a pulse width modulation (PWM) signal.

According to another aspect of the disclosure, a method of operating an engine coolant control system is provided. The method includes pumping first and second portions of coolant from an engine to a regulator and back to the engine and from the engine to a radiator and back to the engine, respectively, sensing a temperature of the coolant at the engine, sensing a temperature of ambient air at the radiator and governing a temperature of the first portion of the coolant and an amount of the first portion of the coolant permitted to flow from the engine to the regulator in accordance with the respective temperatures of the coolant and the ambient air.

In accordance with additional or alternative embodiments, the governing of the temperature includes activating a heating element at one of a location upstream from the regulator and the regulator.

In accordance with additional or alternative embodiments, the governing of the amount of the first portion of the coolant permitted to flow from the engine to the regulator includes proportionally opening or closing a valve disposed between the engine and the regulator.

In accordance with additional or alternative embodiments, the governing includes decreasing the amount of the first portion of the coolant permitted to flow from the engine to the regulator relative to an amount of the second portion of the coolant in accordance with the temperature of the ambient air being relatively high as compared to a predefined temperature.

In accordance with additional or alternative embodiments, the governing includes heating the first portion of the coolant permitted to flow from the engine to the regulator in accordance with the temperature of the ambient air being relatively low as compared to a predefined temperature.

In accordance with additional or alternative embodiments, the governing of the temperature of the first portion of the coolant and the amount of the first portion of the coolant permitted to flow from the engine to the regulator is in accordance with the respective temperatures of the coolant and the ambient air and an optimal operating temperature range of the regulator.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, variable management of gas systems in a compressed natural gas (CNG) powered truck is provided for use in cold or hot weather. The variable management is provided by way of a transport refrigeration unit (TRU) being fit with ambient air temperature and engine coolant temperature sensors in order to allow for monitoring of ambient air and engine coolant temperatures by an electronic controller. In addition, a gas regulator coolant hose is fit with an electrical heater as well as an electric throttle valve (as a variant the heater can be also integrated inside a body of the regulator). The heater allows the coolant to be warmed up across the regulator independently from engine coolant temperatures. The valve allows for management of coolant flow moving across the regulator. The electronic controller is set to monitor temperatures. In low ambient conditions, the electronic controller switches on the heater and closes the valve. In normal running conditions, the electronic controller switches the heater off and opens the valve. In high ambient conditions, the controller switches off the heater and manages the valve in order to switch off the coolant flow across the regulator.

Figure 1:
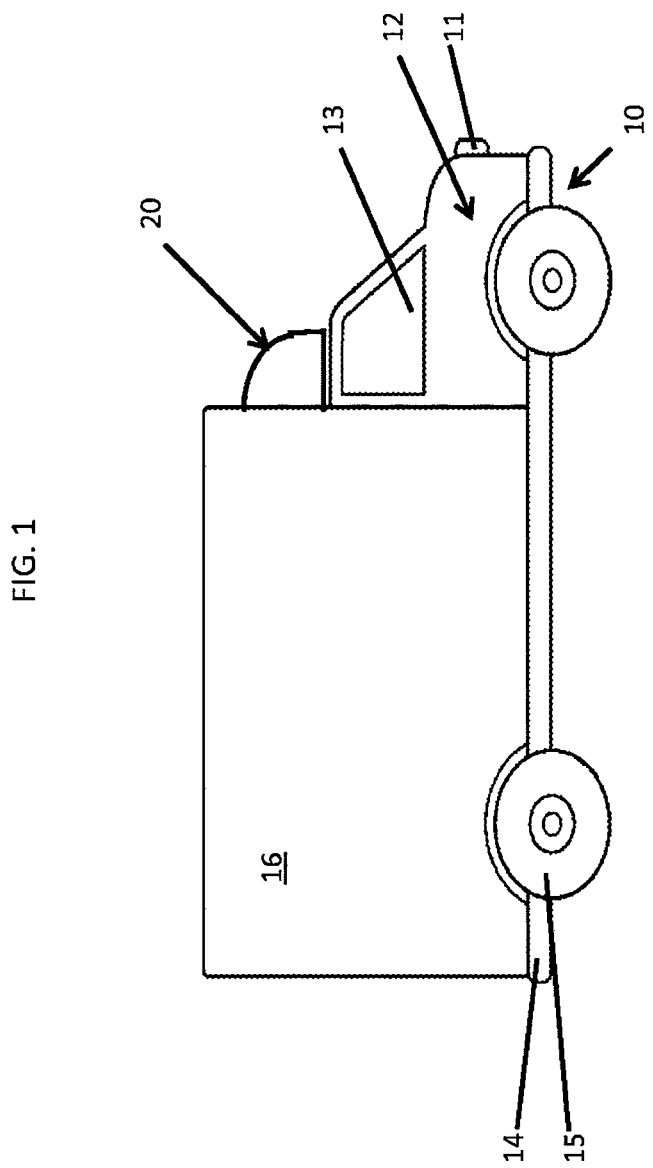
FIG. 1 is a schematic diagram of a vehicle with a transport refrigeration unit (TRU) in accordance with embodiments.

With reference to FIG. 1, a vehicle 10 is provided for transport and delivery of certain items requiring environmental control during shipment. The vehicle 10 may be configured as a truck 11 with an engine 12, a passenger compartment 13, a chassis and a truck bed 14, wheels 15 and a container 16 in which the items requiring environmental control are accommodated during shipment. The vehicle 10 may further include a transport refrigeration unit (TRU) 20. The TRU 20 is coupled to the container 16 and is configured to provide for the environmental control required by the items during shipment within an interior of the container 16.

Figure 2:
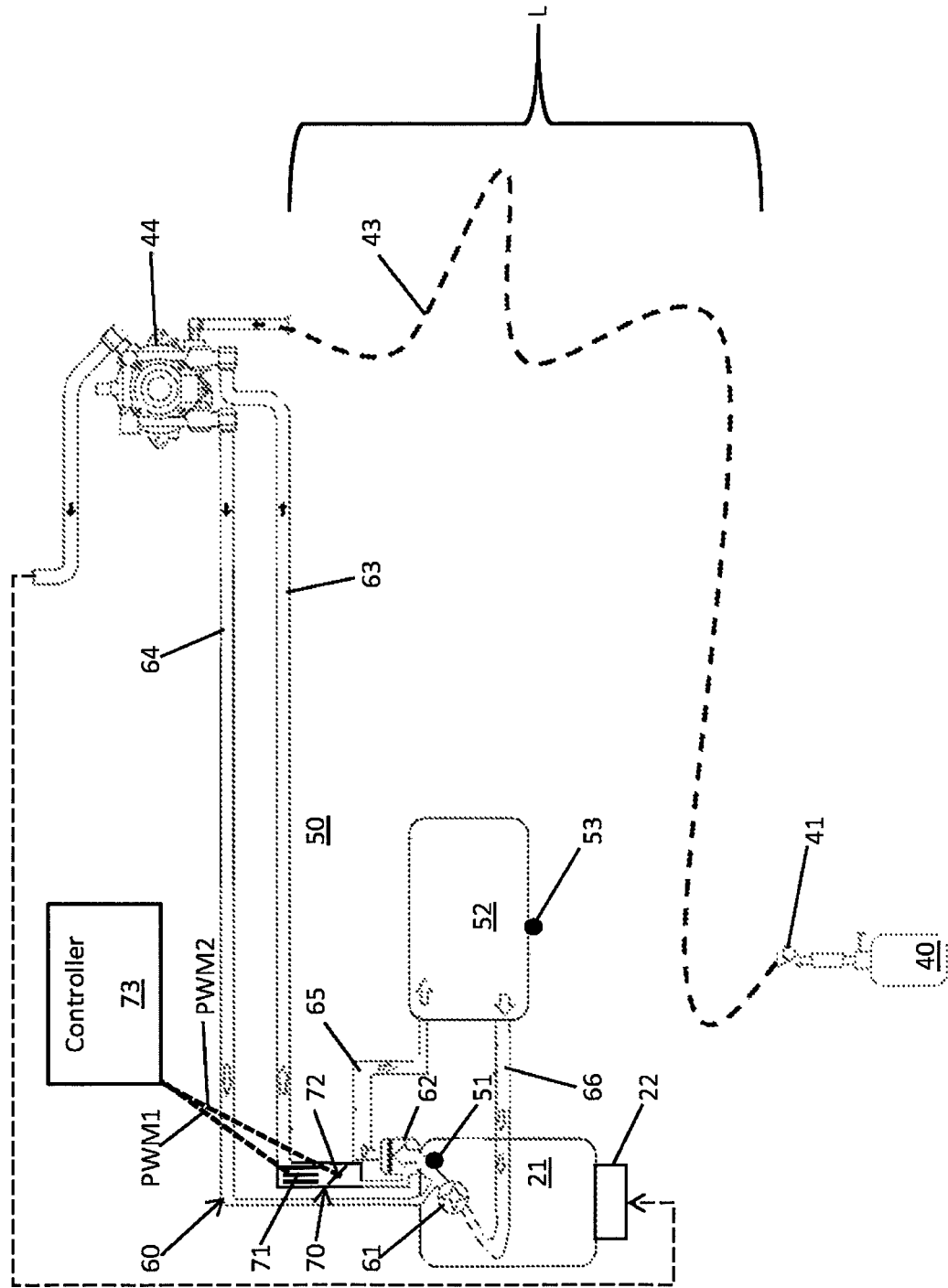
FIG. 2 is a schematic illustration of an engine coolant control system in accordance with embodiments.
Figure 3:
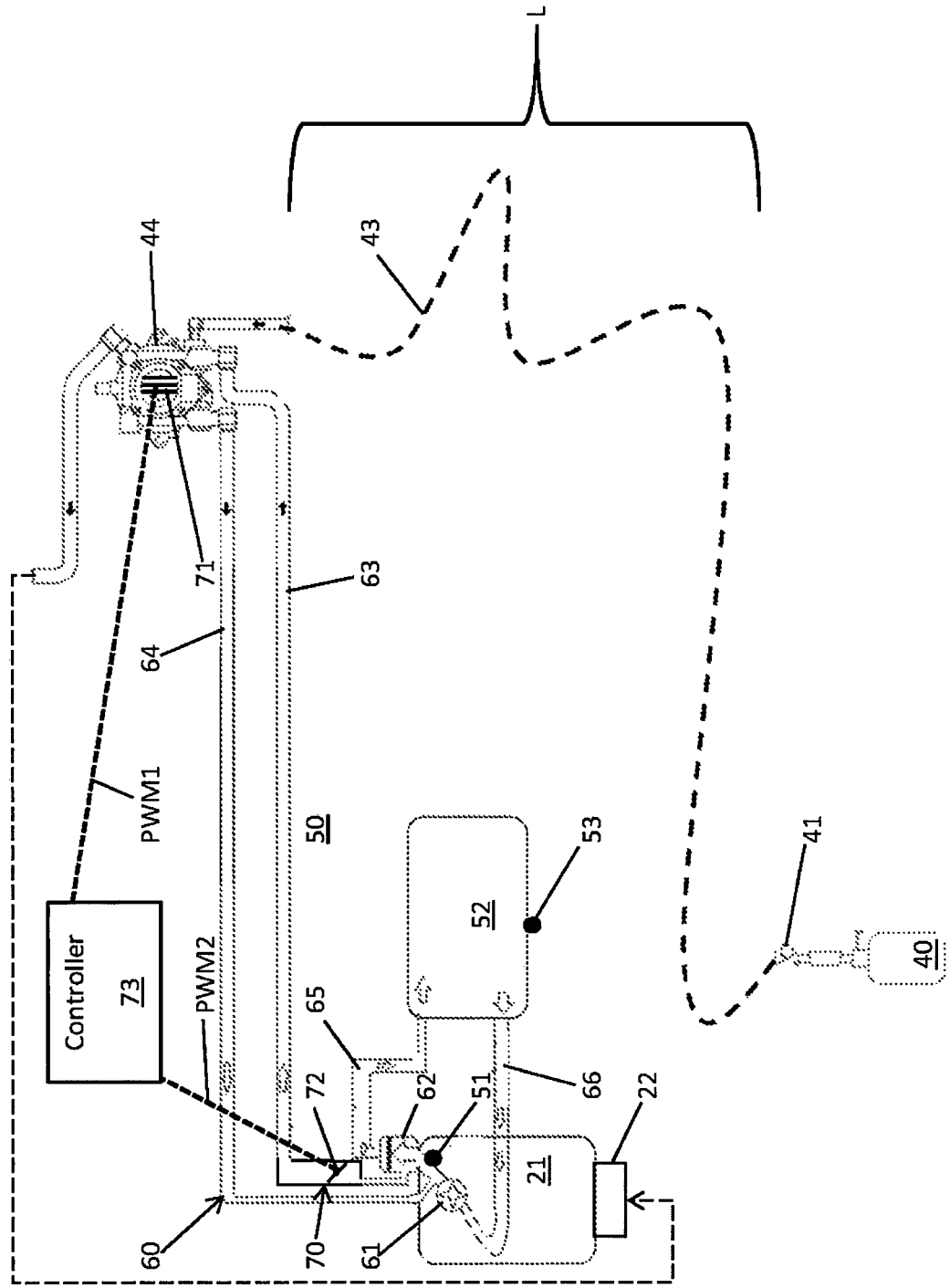
FIG. 3 is a schematic illustration of an engine coolant control system in accordance with alternative embodiments.

With continued reference to FIG. 1 and with additional reference to FIGS. 2 and 3, the TRU 20 includes an engine system and an exhaust system. The engine system includes an engine 21, which may include or be configured as a compressed natural gas (CNG) engine that is powered by vaporized natural gas and is liquid-cooled, a mixer 22, an air supply portion and a fuel supply portion. During operations of the engine 21, air and fuel are drawn into the mixer 22 through the air and fuel supply portions, respectively. Within the mixer 22, the air and the fuel are mixed for combustion within the engine 21 whereupon the engine 21 drives operations of the TRU 20 from the production of high temperature and high pressure exhaust gas. The exhaust gas is flown through the exhaust system and exhausted to an exterior of the TRU 20.

As shown in FIGS. 2 and 3, where the engine 21 is a CNG engine, the fuel supply portion includes a gas tank 40, which is fitted with a primary regulator 41. The primary regulator 41 is fluidly coupled to gas piping 43 and the gas piping 43 is fluidly coupled to a secondary regulator 44. In some instances, such as those cases where the vehicle 10 is a truck 11 and the engine 21 is a CNG engine (hereinafter it will be understood that the engine 21 is a CNG engine that is powered by vaporized natural gas and is liquid-cooled), the primary and secondary regulators 41 and 44 are a distance apart and the gas piping 43 has a length L that is on an order of about 1-10 meters. This length L results in a possibility that gas flown through the gas piping 43 could liquefy prior to reaching the secondary regulator 44 due to exposure of the gas piping 43 to low ambient temperatures even if the primary regulator 41 operates to lower a pressure of the gas supplied to the gas piping 43 from the gas tank 40 (e.g., from 1 Mpa to 0 or a negative pressure). As such, the secondary regulator 44 is typically provided with a source of heat, such as heated engine coolant from the engine 21, to vaporize liquid or liquefied gas.

With the configuration provided above, an engine coolant control system 50 is provided to variably manage engine coolant of the engine 21 which is used by the secondary regulator 44.

The engine coolant control system 50 includes the engine 21 and a temperature sensor 51 of or disposed at the engine 21, a radiator 52 which serves as a heat exchanger for the engine 21 and an ambient temperature sensor 53 of or disposed at the radiator 52 and the regulator 44 through which gas is flown prior to being flown toward the engine 21. The engine coolant control system 50 further includes a piping system 60 by which first and second portions of coolant are pumped from the engine 21 to the secondary regulator 44 and back to the engine 21 and from the engine 21 to the radiator 52 and back to the engine 21, respectively, and a governing system 70. The governing system 70 governs a temperature of the first portion of the coolant and an amount of the first portion of the coolant permitted to flow from the engine 21 to the secondary regulator 44 in accordance with readings of the temperature sensor 51 and in accordance with readings of the ambient temperature sensor 53.

The radiator 52 may include or be provided as a heat exchanger through which the second portion of the coolant is flown to thermally interact with a flow of the ambient air. Also, as described above, the secondary regulator 44 is fluidly interposed between the primary regulator 41 of the gas tank 40 and the mixer 22 of the engine 21 such that the secondary regulator 44 is receptive of gas from the primary regulator 41 along the gas piping 43 which is on the order of 1-10 meters in length L.

The piping system 60 includes a coolant pump 61 which is configured to pump the first and second portions of the coolant toward the secondary regulator 44 and the radiator 52, respectively, and a coolant thermostat 62 which moderates relative quantities of the first and second portions based on a heated condition of the coolant. The piping system 60 further includes a first line 63, a second line 64, a third line 65 and a fourth line 66. The first line 63 extends from the coolant thermostat 62 to the secondary regulator 44 whereby the first portion of the coolant flows through the first line 63 from the coolant thermostat 62 to the secondary regulator 44. The second line 64 extends from the secondary regulator 44 to the engine 21 (upstream from the coolant pump 61) whereby the first portion of the coolant flows through the second line 64 from the secondary regulator 44 to the engine 21. The third line 65 extends from the coolant thermostat 62 to the radiator 52 whereby the second portion of the coolant flows through the third line 65 from the coolant thermostat 62 to the radiator 52. The fourth line 66 extends from the radiator 52 to the engine 21 (upstream from the coolant pump 61) whereby the second portion of the coolant flows through the fourth line 66 from the radiator 52 to the engine 21.

The governing system 70 includes a heating element 71, a valve 72 and a controller 73. The heating element 71 may include or be provided as a glow plug or a heater resistor and is disposed to heat coolant at one of a location along the first line 63 upstream from the secondary regulator 44 (see FIG. 2) and a location at the secondary regulator 44 (see FIG. 3). The valve 72 may include or be provided as a throttling valve and is operably disposed along the first line 63 between the engine 21 and the secondary regulator 44. The controller 73 controls operations of the heating element 71 and the valve 72 in accordance with the readings of the temperature sensor 51 and in accordance with readings of the ambient temperature sensor 53.

In accordance with embodiments, signals issued from the controller 73 to the heating element 71 and the valve 72 to thereby control operations of the heating element 71 and the valve 72 may include or be provided as pulse width modulation (PWM) signals PWM1 and PWM2. The PWM signal PWM1 may be configured to cause the heating element 71 to proportionally heat up or cool down in gradual degrees while the PWM signal PWM2 may be configured to cause the valve 72 to proportionally open or close by gradual degrees. The PWM signals PWM1 and PWM2 may be issued alone or in sequence with one another as determined for meeting requirements of the engine coolant control system 50 by the controller 73 in accordance with the readings of the temperature sensor 51 and in accordance with readings of the ambient temperature sensor 53.

In an exemplary case in which readings of the ambient temperature sensor 53 indicate that a temperature of the ambient air is relatively high as compared to a predefined temperature (e.g., during a relatively hot day when a risk of vapor gas turning to liquid in the gas piping 43 is relatively low), the controller 73 may determine that a relatively low quantity of coolant heated in the engine 21 is required to vaporize gas in the secondary regulator 44. Thus, the controller 44 may issue the PWM signal PWM2 to the valve 72 such that the valve 72 proportionally closes so as to decrease the amount of the first portion of the coolant permitted to flow along the first line 63 from the engine 21 to the secondary regulator 44 relative to an amount of the second portion of the coolant.

By contrast, in an exemplary case in which readings of the ambient temperature sensor 53 indicate that a temperature of the ambient air is relatively low as compared to a predefined temperature (e.g., during a relatively cold day when a risk of vapor gas turning to liquid in the gas piping 43 is relatively high), the controller 73 may determine that a normal quantity of coolant heated in the engine 21 will not be sufficient to vaporize gas in the secondary regulator 44. Thus, the controller 44 may issue the PWM signal PWM1 to the heating element 71 such that the heating element 71 proportionally heats up so as to add heat to the first portion of the coolant that is already heated by the engine 21.

In still further cases, the governing of the temperature of the first portion of the coolant and the amount of the first portion of the coolant permitted to flow from the engine 21 to the secondary regulator 44 is or may be conducted in accordance with the respective temperatures of the coolant and the ambient air as sensed by the temperature sensor 51 and the ambient temperature sensor 53, respectively, and an optimal operating temperature range of the secondary regulator 44.

Figure 4:
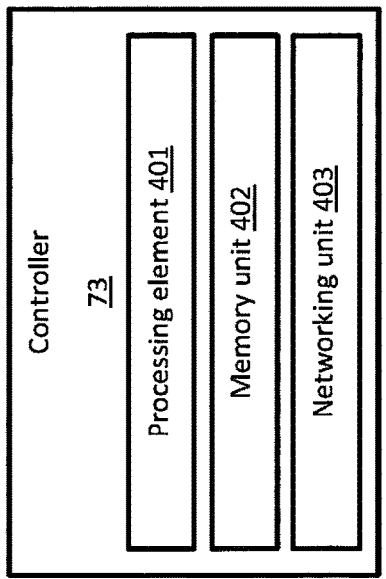
FIG. 4 is a schematic diagram illustrating components of a controller of the engine coolant control system of FIGS. 2 and 3.

With reference to FIG. 4, the controller 73 may be provided or configured as a safety controller and may include a processing element 401, a memory unit 402 and a networking unit 403. The processing element 401 is communicative with the temperature sensor 51 and the ambient temperature sensor 53 and with the heating element 71 and the valve 72 by way of the networking unit 403. The memory unit 402 has executable instructions stored thereon, which, when executed, cause the processing element 401 to operate effectively as a central processing unit (CPU) of the controller 73 such that the controller 73 operates substantially as described herein. The memory unit 402 may also have operating temperature range information stored thereon for conducting the governing in accordance with, for example, the optimal operating temperature range of the secondary regulator 44.

Figure 5:
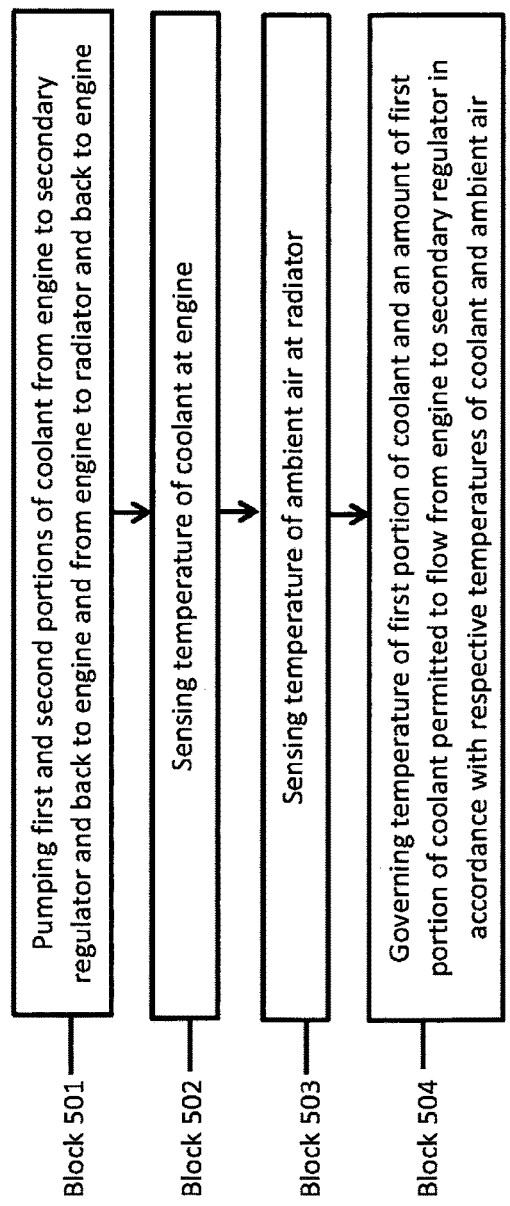
FIG. 5 is a flow diagram illustrating a method of operating an engine coolant control system in accordance with embodiments.

With reference to FIG. 5, a method of operating an engine coolant control system 50 as described herein is provided. As shown in FIG. 5, the method includes pumping first and second portions of coolant from the engine 21 to the secondary regulator 44 and back to the engine 21 and from the engine 21 to the radiator 52 and back to the engine 21, respectively (block 501), sensing a temperature of the coolant at the engine 21 (block 502), sensing a temperature of ambient air at the radiator 52 (block 503) and governing a temperature of the first portion of the coolant and an amount of the first portion of the coolant permitted to flow from the engine 21 to the secondary regulator 44 in accordance with the respective temperatures of the coolant and the ambient air (block 504).

In accordance with embodiments, the governing of the temperature of block 504 may include activating the heating element 71 at one of the location along the first line 63 upstream from the secondary regulator 44 and the location at the secondary regulator 44 and the governing of the amount of the first portion of the coolant permitted to flow from the engine 21 to the secondary regulator 44 of block 504 may include proportionally opening or closing the valve 72 disposed between the engine 21 and the secondary regulator 44.

In accordance with further embodiments, the governing of block 504 may include decreasing the amount of the first portion of the coolant permitted to flow from the engine 21 to the secondary regulator 44 relative to an amount of the second portion of the coolant in accordance with the temperature of the ambient air being relatively high as compared to a predefined temperature. Alternatively, the governing of block 504 may include heating the first portion of the coolant permitted to flow from the engine 21 to the secondary regulator 44 in accordance with the temperature of the ambient air being relatively low as compared to a predefined temperature. Still further, the governing of block 504 may be conducted in accordance with the respective temperatures of the coolant and the ambient air as sensed by the temperature sensor 51 and the ambient temperature sensor 53, respectively, and an optimal operating temperature range of the secondary regulator 44.

The systems and methods described herein allow for optimized cooling and warming of the regulator depending on ambient running conditions, ensure that coolant flow is properly used following ambient conditions (e.g., optimized radiator coolant flow in high ambient conditions results in optimized engine cooling), ensure that the regulator runs in correct temperature range (minimum and maximum), ensure that gas is properly supplied to the engine regardless of ambient conditions and provide for fast warm-up of the regulator (e.g., in very cold ambient running conditions).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A governing system of an engine coolant control system in which a first portion of coolant is pumped from an engine to a regulator and back to the engine and a second portion of the coolant is pumped from the engine to a radiator and back to the engine, the governing system comprising:
   a temperature sensor of the engine to sense coolant temperatures;
   an ambient temperature sensor of the radiator to sense ambient temperatures;
   a heating element disposed to heat the first portion of the coolant at one of a location upstream from the regulator and a location at the regulator;
   a valve operably disposed along a section of piping through which the first portion of the coolant flows from the engine to the regulator; and
   a controller which controls operations of the heating element and the valve in accordance with the readings of the temperature sensor of the engine and the ambient temperature sensor.

2. The governing system according to claim 1, wherein the heating element comprises a glow plug or a heater resistor.

3. The governing system according to claim 1, wherein the valve comprises a throttling valve.

4. The governing system according to claim 3, wherein a signal issued from the controller to the throttling valve to control operations of the throttling valve comprises a pulse width modulation (PWM) signal.

5. An engine coolant control system, comprising:
   an engine;
   a temperature sensor of the engine to sense coolant temperatures;
   a radiator comprising an ambient temperature sensor to sense ambient temperatures;
   a regulator through which gas is flown prior to being flown toward the engine;
   a piping system by which a first portion of coolant is pumped from the engine to the regulator and back to the engine and a second portion of the coolant is pumped from the engine to the radiator and back to the engine, respectively; and
   a governing system which comprises a heating element disposed to heat coolant at one of a location upstream from the regulator and a location at the regulator and which governs a temperature of the first portion of the coolant and an amount of the first portion of the coolant permitted to flow from the engine to the regulator in accordance with readings of the temperature sensor of the engine and the ambient temperature sensor.

6. The engine coolant control system according to claim 5, wherein the engine comprises a compressed natural gas (CNG) engine.

7. The engine coolant control system according to claim 5, wherein the radiator comprises a heat exchanger in which the second portion of the coolant thermally interacts with a flow of ambient air.

8. The engine coolant control system according to claim 5, wherein the regulator comprises a secondary regulator and is fluidly interposed between a primary regulator of a gas tank and a mixer of the engine.

9. The engine coolant control system according to claim 8, wherein the secondary regulator is receptive of gas from the primary regulator along gas piping which is on an order of 1-10 meters in length.

10. The engine coolant control system according to claim 5, wherein the piping system comprises:
    a coolant pump configured to pump the first and second portions of the coolant toward the regulator and the radiator, respectively; and
    a coolant thermostat which moderates relative quantities of the first and second portions.

11. The engine coolant control system according to claim 5, wherein the governing system comprises:
    a valve operably disposed along piping interposed between the engine and the regulator; and
    a controller which controls operations of the heating element and the valve in accordance with the readings of the temperature and the ambient temperature sensors.

12. The engine coolant control system according to claim 11, wherein the heating element comprises a glow plug or a heater resistor.

13. The engine coolant control system according to claim 11, wherein the valve comprises a throttling valve.

14. The engine coolant control system according to claim 13, wherein a signal issued from the controller to the throttling valve to control operations of the throttling valve comprises a pulse width modulation (PWM) signal.

15. A method of operating an engine coolant control system, the method comprising:
pumping first and second portions of coolant from an engine to a regulator and back to the engine and from the engine to a radiator and back to the engine, respectively;
sensing a temperature of the coolant at the engine;
sensing a temperature of ambient air at the radiator; and
governing a temperature of the first portion of the coolant and an amount of the first portion of the coolant permitted to flow from the engine to the regulator in accordance with the respective temperatures of the coolant and the ambient air,
wherein the governing of the temperature comprises activating a heating element at one of a location upstream from the regulator and a location at the regulator.

16. The method according to claim 15, wherein the governing of the amount of the first portion of the coolant permitted to flow from the engine to the regulator comprises proportionally opening or closing a valve disposed between the engine and the regulator.

17. The method according to claim 15, wherein the governing comprises decreasing the amount of the first portion of the coolant permitted to flow from the engine to the regulator relative to an amount of the second portion of the coolant in accordance with the temperature of the ambient air being relatively high as compared to a predefined temperature.

18. The method according to claim 15, wherein the governing comprises heating the first portion of the coolant permitted to flow from the engine to the regulator in accordance with the temperature of the ambient air being relatively low as compared to a predefined temperature.

19. The method according to claim 15, wherein the governing of the temperature of the first portion of the coolant and the amount of the first portion of the coolant permitted to flow from the engine to the regulator is in accordance with:
the respective temperatures of the coolant and the ambient air, and
an optimal operating temperature range of the regulator.

* * * * *